Patented July 7, 1931

1,813,664

UNITED STATES PATENT OFFICE

WALTER G. CHRISTIANSEN, OF BLOOMFIELD, AND RAYMOND VAN WINKLE, OF PASSAIC, NEW JERSEY, ASSIGNORS TO E. R. SQUIBB & SONS, OF NEW YORK, N. Y., A CORPORATION OF NEW YORK

TREATMENT AND PACKAGING OF ETHER

No Drawing.   Application filed February 15, 1930.   Serial No. 428,855.

Our invention relates to the treatment and packaging of ether to remove oxygen and oxidative impurities therefrom and/or to prevent the formation of oxidative impurities therein.

Ether deteriorates by reacting with oxygen to form peroxides, which in turn by interaction and/or decomposition yield aldehydes and other substances. By the term "oxidative impurities" herein we mean to designate all such peroxides, aldehydes, and related contaminating products. This deterioration increases, of course, with lapse of time, and is favored by the following circumstances: the presence, as is usual, of dissolved oxygen in the ether as ordinarily manufactured; exposure to light, particularly direct sunlight; heat, especially when in a sealed vessel; and contact with the tin of containers. A small proportion of these oxidative impurities suffices to render the ether unfit for anesthetic use and otherwise diminishes its value.

It is the object of our invention to provide a method and a package whereby ether containing an excess of oxidative impurities may be purified to such a degree as to be rendered suitable for use in producing anesthesia; and whereby oxygen may be removed from ether in order to prevent the formation of oxidative impurities therein.

In the practice of our invention we bring a cuprous compound into contact with the ether to be treated, preferably under anaeric conditions, the quantity of the cuprous compound varying more or less directly as the quantity of ether and inversely as the period of contact. Among the cuprous compounds whose efficacy we have demonstrated are the oxide, the chloride, the sulphide, the sulphite, and the thiocyanate. Apparently copper in the cuprous state possesses a greater affinity for oxygen than does ether, and is therefore able to combine with the dissolved oxygen in preference to the ether and/or to decompose the oxidative impurities and unite with their active oxygen. It is inferable from observations made that the cuprous compounds physically adsorb the dissolved oxygen present and chemically reduce the oxidative impurities. Whatever may be the correct theory underlying their action, cuprous compounds remove dissolved oxygen from ether and, even under such adverse conditions as the presence of light, heat, and tin, maintain such ether virtually free from oxidative impurities for an indefinite period; and/or diminish the oxidative impurities in deteriorated ether to well within the limit prescribed by the United States Pharmacopœia.

As an example, we may continuously percolate ether containing an excess of oxidative impurities at the rate of 50 to 60 cubic centimeters per minute through a column 18 inches in height and one inch in diameter of thoroughly dried six-mesh granular precipitated cuprous oxide. Should there be an undue amount of acid in the ether after this treatment, a layer of thoroughly dried, preferably granular, magnesium oxide placed beneath the cuprous oxide will remove such acid without altering the specific gravity of the ether or having any other prejudicial effect.

As a further example, dissolved oxygen may be removed from ether meeting the United States Pharmacopœia standards by percolation through a similar column under anaeric conditions, at a rate that is a function of the height of the column and the proportion of oxygen dissolved in the ether.

As a still further example, we may confine about .15 gram of finely divided cuprous oxide with 114 grams of ether in an ordinary sealed tin container.

It will be understood that the specific details herein set forth are merely illustrative and by no means limitative of our invention, which may be variously otherwise embodied—for instance as to the particular cuprous compounds used, the modes of applying them to the ether, and the packages employed—within the scope of the appended claims.

We claim:

1. The process that comprises causing ether to contact with a cuprous compound.

2. The process that comprises causing ether to remain in prolonged contact with less than 1 percent by weight of cuprous oxide.

3. The process that comprises reducing the amount of oxidative impurities and dissolved oxygen in ether by means of a cuprous compound.

4. The process that comprises reducing the dissolved-oxygen content of ether by means of a cuprous compound.

5. The process that comprises bringing cuprous oxide into contact with ether to free the latter substantially from oxidative impurities.

6. The process that comprises treating ether anaerically with a cuprous compound.

7. The process that comprises treating ether anaerically with cuprous oxide.

8. The process that comprises preventing substantially the formation of oxidative impurities in ether by maintaining it in contact with a cuprous compound under anaeric conditions.

9. The process that comprises rendering ether substantially oxygen-free by contacting it with cuprous oxide under anaeric conditions.

10. The process that comprises percolating ether through a cuprous compound.

11. The process that comprises percolating ether through cuprous oxide.

12. The process that comprises percolating ether through a column of granular precipitated cuprous oxide to free the ether from oxidative impurities.

13. A package comprising a container having ether and a cuprous compound therein.

14. A package comprising a container having ether and cuprous oxide therein.

15. A package comprising a tin container having ether and a cuprous compound therein.

16. A package comprising a tin container having ether and cuprous oxide therein.

In witness whereof we affix our signatures.

WALTER G. CHRISTIANSEN.
RAYMOND VAN WINKLE.